(12) United States Patent
Rousselle (10) Patent No.: US 8,275,570 B2
(45) Date of Patent: Sep. 25, 2012

(54) THERMAL POWERLINE RATING AND CLEARANCE ANALYSIS USING LOCAL THERMAL SENSOR

(75) Inventor: Adam Robert Rousselle, New Hope, PA (US)

(73) Assignee: Utility Risk Management Corporation, LLC, Stowe, VT (US)

( * ) Notice: Subject to any disclaimer, the term of this patent is extended or adjusted under 35 U.S.C. 154(b) by 0 days.

(21) Appl. No.: 13/212,689

(22) Filed: Aug. 18, 2011

(65) Prior Publication Data

US 2012/0022822 A1    Jan. 26, 2012

Related U.S. Application Data

(60) Provisional application No. 61/448,300, filed on Mar. 2, 2011.

(51) Int. Cl.
*G01K 3/04* (2006.01)
*G01K 3/06* (2006.01)
*G01C 15/02* (2006.01)
*G01C 15/04* (2006.01)

(52) U.S. Cl. ......... 702/130; 702/136; 702/150; 702/152

(58) Field of Classification Search .................. 702/19, 702/45, 50, 130, 157, 158, 188; 250/383.3; 315/297; 382/154; 706/54
See application file for complete search history.

(56) References Cited

U.S. PATENT DOCUMENTS

| | | | |
|---|---|---|---|
| 4,268,818 A | 5/1981 | Davis et al. | |
| 4,384,289 A | 5/1983 | Stillwell et al. | |
| 4,635,055 A | 1/1987 | Fernandes et al. | |
| 4,728,887 A | 3/1988 | Davis | |
| 4,818,990 A | 4/1989 | Fernandes | |
| 4,821,138 A | 4/1989 | Nakano et al. | |
| 4,904,996 A | 2/1990 | Fernandes | |
| 5,341,088 A | 8/1994 | Davis | |
| 5,502,307 A * | 3/1996 | Baliga et al. | 250/338.3 |
| 6,776,522 B2 | 8/2004 | Syracuse et al. | |
| 6,853,327 B2 | 2/2005 | Miceli et al. | |
| 7,046,841 B1 * | 5/2006 | Dow et al. | 382/154 |
| 7,369,045 B2 | 5/2008 | Hansen | |
| 7,575,371 B1 | 8/2009 | Yakymyshyn et al. | |

(Continued)

OTHER PUBLICATIONS

"Temperature Measurement on Overhead Transmission Lines (OHTL) Utilizing Surface Acoustic Wave (SAW) Sensors", CIRED, 19th International Conference on Electricity Distribution, Vienna, May 21-24, 2007, pp. 1-4.

(Continued)

*Primary Examiner* — Mohamed Charioui
*Assistant Examiner* — Felix Suarez
(74) *Attorney, Agent, or Firm* — Pepper Hamilton LLP (57) ABSTRACT

A method for modeling of an overhead electrical conductor, includes: collecting 3-dimensional location data of the conductor; substantially simultaneous with said collecting, acquiring a thermal measurement of the conductor with a local thermal sensor; and generating a CAD model of the conductor using the collected 3-dimensional location data of the conductor and the thermal measurement of the conductor. The CAD model facilitates thermal line analysis of the conductor, thermal rating of a power line that includes the conductor, clearance analysis relative to the conductor, and vegetation management relative to the conductor. Apparatus for determining temperature of the overhead electrical conductor, includes: a local thermal sensor that acquires thermal measurements of the conductor; and a data processor that extracts thermal readings from the thermal measurement, and processes the thermal readings and remotely collected 3-dimensional location data of the conductor to determine the temperature of the conductor.

18 Claims, 3 Drawing Sheets

U.S. PATENT DOCUMENTS

| | | | |
|---|---|---|---|
| 2004/0105635 A1 | 6/2004 | Nandi et al. | |
| 2009/0267540 A1* | 10/2009 | Chemel et al. | 315/297 |
| 2010/0017153 A1 | 1/2010 | Strehl | |
| 2010/0076719 A1 | 3/2010 | Lawry et al. | |
| 2010/0198775 A1* | 8/2010 | Rousselle et al. | 706/54 |

OTHER PUBLICATIONS

"SAW sensors—Wireless Temperature Measurement", http://enbw.com/content/en/group/innovations/energy_transmission_in_the_network, 2011.

"Overhead Powerline—Strain & Temperature Monitoring" http://www.sensornet.co.uk/news/case-studies/overhead-powerline--strain-temperature, 2011, pp. 1-3.

"Real Time Monitoring of Power Cables by Fibre Optic Technologies Tests, Applications and Outlook", JICABLE, Jun. 22-26, 2003—International Conference on Insulated Power Cables, Paris, France, pp. 1-7.

"Power Donut2 System for Overhead Transmission Line Monitoring", USi Real-time Answers/Integrated Solutions, Armonk, NY, Oct. 2006, pp. 1-17.

"Emissivity of aluminium and its importance for radiometric measurement", J. Bartl, M. Baranek, Measurement Science Review, vol. 4, Section 3, 2004, pp. 31-36.

"LIDAR Imaging Takes Flight in Canada", Utility Automation & Engineering T&D Magazine, Dec. 2007, pp. 1-6.

"Combined distributed temperature sensing and current monitoring", Sebastian Kramer, et al., Fiber Optic Sensors and Applications V, Proc of SPIE, vol. 6770, (2007), pp. 677015-1-677015-9.

"Principles of Infrared Thermometry", W.R. Barron, Williamson Corporation, Sensors, Dec. 10-19, 1992, pp. Z-59-Z62.

"Optical Properties of Aluminum Oxide: Determined from Vacuum Ultraviolet and Electron Energy-Loss Spectrosopies", Roger H. French, et al., J. Am. Ceram. Soc. 81(10), 1998, pp. 2549-2557.

"Matisse: Advanced Earth Modeling for Imaging and Scene Simulation", Pierre Simoneau, et al. Proc. SPIE 4538, 39 (2002); Sep. 2001, pp. 1-10.

"Overview of Powerlines Extraction and Surveillance Using Remote Sensing Technology", Chao Mu, et al., Proc. of SPIE vol. 7498, 2009, pp. 74981M-1-74981M-8.

"Optimize Capacity of Overhead Lines by Conductor Surface Test", Ray Ferraro, Electric Energy Online.com, 2010, pp. 1-4.

"Atmospheric Corrections of Low Altitude Thermal Infrared Airborne Images Acquired Over a Tropical Cropped Area", V. Lebourgeois, et al., IEEE International Geoscience & Remote Sensing Symposium, Boston, (2008), pp. 1-4.

"Airborn Thermal Infrared Remote Sensing Palouse River Basin, WA/ID", Watershed Sciences, Inc., May 2006, pp. i-28.

"Wireless Transmission Line Thermometer", Eknath Vittal, et al. Dec. 2005, pp. 1-23.

"Populating a GIS of Utility Corridor Assets Using an Integrated Airborne Data Acquisition System", Richard Vann, ESRI User Conference, 2000, pp. 1-8.

Lu et al., "Accuracy of Transmission Line Modeling Based on Aerial LiDAR Survey," IEE Transactions on Power Delivery, IEEE Service Center, New York, NY, vol. 23, No. 3, Jul. 2008, pp. 1655-1663.

Stahlhut et al., "Innovative Sensory Concepts for Power Systems," Power Symposium, North American, IEEE, PI, Sep. 1, 2006, pp. 397-404.

Huang et al., "New Type of Fiber Optic Sensor Network for Smart Grid Interface of Transmission Systems," Power and Energy Society General Meeting, 2010 IEEE, IEEE, Piscataway, New Jersey, Jul. 25, 2010, pp. 1-5.

Hooper B., "Vegetation Management Takes to the Air," Transmission & Distribution World Intertec Publishing USA, vol. 55, No. 9, Sep. 2003.

PCT/US2011/048550 International Search Report dated Mar. 23, 2012.

* cited by examiner

THERMAL POWERLINE RATING AND CLEARANCE ANALYSIS USING LOCAL THERMAL SENSOR

CROSS REFERENCE TO RELATED APPLICATIONS

This application is related to commonly assigned, concurrently filed application Ser. No. 13/212,684, and claims priority of U.S. provisional application Ser. No. 61/448,300 filed on Mar. 2, 2011, the entire contents of which is hereby incorporated by reference herein.

BACKGROUND ART

This invention relates generally to the field of powerline management, and, more particularly to a new approach that directly determines temperature of an overhead electrical conductor at time of 3-dimensional location data collection, for use in such applications as CAD modeling of the conductor, thermal line analysis of the conductor, thermal rating of a power line that includes the conductor, clearance analysis relative to the conductor, vegetation management relative to the conductor, and/or other applications especially useful to electric utilities in safeguarding and optimizing their transmission and distribution infrastructure.

LiDAR (Light Detection And Ranging) is used to produce CAD (Computer Assisted Design) models of powerlines. In the process known to industry, LiDAR data is collected using a sensor that is mounted to an aerial platform, tripod or a land vehicle. For clearance analysis during different conductor conditions, it is important to know the temperature at the time the LiDAR data was collected. In the process known to industry, LiDAR data is captured simultaneously with weather and line loading data that allows modeling the conductor temperature.

The process of predicting conductor temperature at time of LiDAR data collection using loading and weather data requires accurate knowledge of weather conditions at the right-of-way. Especially, prediction of wind speed and direction are difficult to perform due to turbulence and high variation of wind speeds. Weather stations have to be employed to acquire the weather information.

The U.S. government is currently mandating modernization of the nation's electrical grid in order to enhance national security. As part of this effort, the North American Electric Reliability Corporation (NERC)—certified by the Federal Energy Regulatory Commission to develop and enforce reliability standards for the electric grid in North America—on Oct. 7, 2010 issued a regulatory alert requiring all transmission line operators to assess within the next three years the precise physical characteristics of their high voltage transmission lines relative to design specifications. NERC recommended that utilities use PLS-CADD (engineering software that determines what the wire's physical properties and where the conductor is located under given conditions, based on temperature and conductor type inputs) to comply with this requirement. The actual conductor temperature will be a leading indicator for NERC.

Current industry practice calculates—rather than measures—the temperature of a bare conductor, utilizing factors such as ambient weather conditions, physical and thermal properties of the conductor, and line loading information. Due primarily to weather variables, this practice can generate a significant margin of error. The associated uncertainty of a conductor's temperature directly limits its capacity.

The power conductors of overhead transmission lines are self-supporting and energized at high voltage. As current flow through conductors increases, the temperature of the conductors increases, causing them to elongate. This elongation increases the sag of the conductors between support points, decreasing the clearance between the conductors and people, the ground, vegetation, buildings and vehicles under the lines. Beyond certain "maximum allowable" sag, the lines may flashover, resulting in either a power supply outage or injury to the public. Additionally, if conductor temperature remains high for an extended period of time, the strength of the conductors and tensioned connectors may decrease, which could trigger mechanical failure during the next occurrence of ice or high wind loading. To avoid excessive sag or loss of strength, limits are placed on maximum operating temperature of the conductor.

BRIEF SUMMARY OF THE INVENTION

Direct contemporaneous thermal measurements, e.g. from a thermal sensor in the vicinity of the conductor, at substantially the same time as 3-dimensional location data (e.g. LiDAR) collection, would bypass many of the current constraints. Accordingly, a method is presented to concurrently acquire direct thermal measurements, for example, from a local thermal sensor, of the conductor and utilize temperature information derived from the diect thermal measurements, along with the collected 3-dimensional location data, in line modeling, line rating, thermal line analysis, clearance analysis, and vegetation management.

According to the present invention, a method is provided for thermal line analysis of an overhead electrical conductor, comprising: collecting 3-dimensional location data of the conductor; substantially simultaneous with said collecting, acquiring a thermal measurement of the conductor with a local thermal sensor; generating a CAD model of the conductor using the collected 3-dimensional location data of the conductor and the thermal measurement of the conductor, and employing the CAD model for thermal line analysis of the conductor.

The thermal measurement may be acquired by a thermal sensor in the vicinity of the conductor (herein referred to as a "local thermal sensor"), e.g. a thermal sensor attached to, embedded in, integral with, adjacent to, locally directed at, or otherwise associated with and in proximity to the conductor. The thermal measurement may advantageously be acquired with a thermal sensor powered by the conductor.

The thermal measurement may be geographically associated with the geographic location of the local thermal sensor and time referenced with a thermal measurement acquisition time. The thermal measurement may be correlated with the collected 3-dimensional location data of the conductor. A thermal reading may be extracted from the thermal measurement, and a temperature of the conductor determined from the thermal reading.

The method may further comprise calibrating the local thermal sensor to cover an expected operational temperature range of the conductor.

In the method for thermal line analysis, acquiring the thermal measurement of the conductor substantially simultaneous with the collecting of the 3-dimensional location data may comprise acquiring the thermal measurement at the same time that the 3-dimensional location data is collected or within a time period that temperature of the conductor is unlikely to vary, e.g. within fifteen minutes of the collecting of the 3-dimensional location data.

The method for thermal line analysis may further include performing a thermal analysis of the thermal measurement to determine temperature of the conductor at the time of collecting the 3-dimensional location data; generating the CAD model of the conductor using the temperature of the conductor determined by the thermal analysis; and employing the CAD model of the conductor to determine a thermal rating of a target line that includes the conductor and/or to analyze clearance between the conductor and surroundings of the conductor. The clearance analysis may comprise conducting at least one of a sway analysis and a sag analysis to determine conductor location in different weather and/or line loading conditions.

In the method for thermal line analysis, the 3-dimensional location data may comprise data collected by a sensor remote from the conductor, for example, LiDAR data collected from an airborne vehicle, such as a helicopter flying above and generally along the conductor route.

A method is also provided for determining temperature of an overhead electrical conductor, comprising: remotely collecting 3-dimensional location data of the conductor; substantially simultaneous with said collecting, acquiring a thermal measurement of the conductor with a local thermal sensor; and performing a thermal analysis of the thermal measurement to determine temperature of the conductor at the time of collecting the 3-dimensional location data. The thermal analysis may include correlating the thermal measurement of the conductor acquired by the local thermal sensor with the remotely collected 3-dimensional location data of the conductor. The method may further comprise generating a CAD model of the conductor using the remotely collected 3-dimensional location data of the conductor and the determined temperature of the conductor, and employing the CAD model for at least one of: thermal line analysis of the conductor, thermal rating of a power line that includes the conductor, clearance analysis relative to the conductor, and vegetation management relative to the conductor.

A method is further provided for modeling of an overhead electrical conductor, comprising: remotely collecting 3-dimensional location data of the conductor; substantially simultaneous with said collecting, acquiring a thermal measurement of the conductor with a local thermal sensor; and generating a CAD model of the conductor using the collected 3-dimensional location data of the conductor and the thermal measurement of the conductor.

Apparatus is provided for determining temperature of an overhead electrical conductor, comprising: a local thermal sensor that acquires thermal measurements of the conductor; and a data processor that extracts thermal readings from the thermal measurements acquired by the local thermal sensor, and processes the thermal readings and remotely collected 3-dimensional location data of the conductor to determine the temperature of the conductor.

The local thermal sensor may comprise a thermal sensor attached to, embedded in, integral with, adjacent to, locally directed at, or otherwise associated with and in proximity to the conductor. The local thermal sensor may comprise a thermometer, a surface acoustic wave temperature sensor, an optical fiber distributed temperature sensor, a donut shaped thermal monitor, an infrared camera or sensor, a thermal line scanner, or other available thermal sensing, monitoring and/or measurement device.

In addition to thermal measurement data acquisition, the local thermal sensor may further include data storage, formatting, processing and/or communicating facilities. The thermal measurements from the local thermal sensor may be communicated directly to the data processor or via a sensor controller, the internet, or other intermediary or modality. The thermal measurements may, advantageously, be communicated wirelessly.

The apparatus may further include a fixture or other mounting arrangement for positioning the local thermal sensor on, or in the vicinity of, the conductor. The apparatus may also include modules for geographically associating the thermal measurement with the geographic location of the local thermal sensor and for time referencing the thermal measurement with a thermal measurement acquisition time. The apparatus may further include modules to correlate the thermal measurement with the collected 3-dimensional location data of the conductor, to extract a thermal reading from the thermal measurement, and to determine temperature of the conductor from the extracted thermal reading.

The apparatus may further include a LiDAR sensor or other sensor remotely collecting 3-dimensional location data of the conductor substantially simultaneous with the local thermal sensor acquiring the thermal measurement of the conductor. The data processor may further perform at least one of: thermal modeling of the conductor, thermal line analysis of the conductor, thermal rating of a line containing the conductor, and clearance analysis relative to the conductor, based on the determined temperature of the conductor.

Apparatus is further provided for determining temperature of an overhead electrical conductor, comprising: a remote location sensor collecting 3-dimensional location data of the conductor; a local thermal sensor acquiring a thermal measurement of the conductor substantially simultaneous with said collecting; and a data processor correlating the collected 3-dimensional location data of the conductor and the thermal measurement of the conductor to determine the temperature of the conductor at time of collection of the 3-dimensional location data of the conductor. The location sensor may comprise a LiDAR sensor or other remote location data collecting sensor, and the local thermal sensor may comprise a thermometer or other thermal sensing, monitoring or measurement device associated with and in proximity to the conductor.

The data processor of the apparatus may generate a CAD model of the conductor using the 3-dimensional location data of the conductor collected by the remote location sensor, and the thermal measurement of the conductor acquired by the local thermal sensor, and may also perform at least one of: thermal modeling of the conductor, determining thermal rating of a line containing the conductor, thermal line analysis of the conductor, and analyzing clearance between the conductor and surroundings of the conductor, based on the determined temperature.

BRIEF DESCRIPTION OF THE DRAWING FIGURES

Various aspects, features and advantages of the present invention will be apparent from the following detailed description of illustrative embodiments read in conjunction with the accompanying drawings, in which.

DETAILED DESCRIPTION

Figure 1:
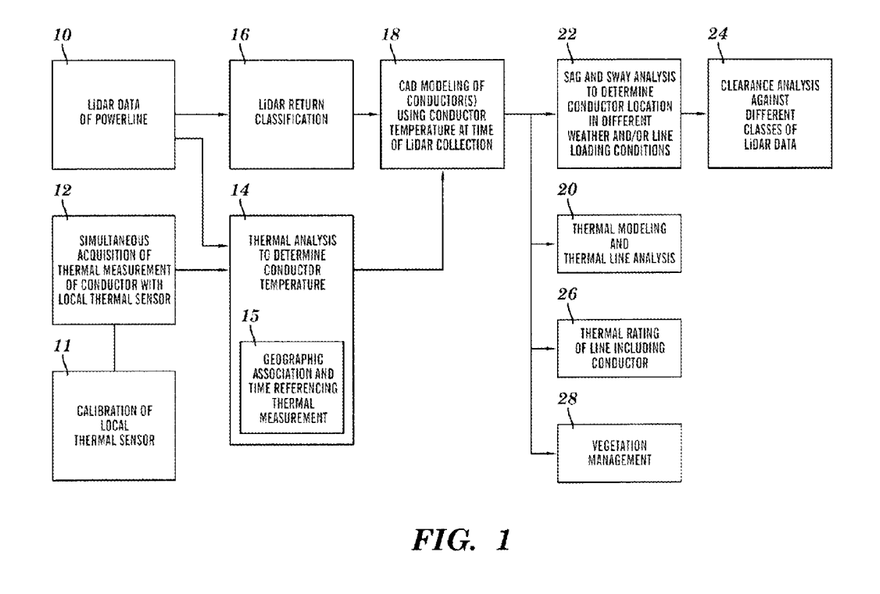
FIG. 1 illustrates an example of a thermal line analysis method using a local thermal sensor.

FIG. 1 provides an overview of a method for thermal line analysis of an overhead electrical conductor in accordance with the principles of the present invention. The method may include the following steps.

LiDAR Data Collection of a Powerline (10)

Collecting LiDAR data over a powerline is a process well known to the industry.

Optional Calibration of Local Thermal Sensor (11)

The local thermal sensor may optionally, but advantageously be precalibrated to cover an expected operational temperature range of the conductor, e.g. −50 degrees to 150 degrees or to 250 degrees Centigrade, using a blackbody or other known calibration process.

Simultaneous Acquisition of Thermal Measurement of the Conductor with Local Thermal Sensor (12)

Simultaneous acquisition of thermal measurement(s) of the conductor with a local thermal sensor may be accomplished employing the process and the equipment described in detail below.

Linking Local Thermal Sensor Measurement(s) to the Location and Time of LiDAR Data Collection (15) and Determining Conductor Temperature (14)

The thermal measurements, acquired by the local thermal sensor, are linked to geographic location of the local thermal sensor and time referenced with a thermal measurement acquisition time. Determining the conductor temperature may be accomplished according to the process described in detail below.

LiDAR Return Classification (16)

LiDAR return classification is a process well known in the industry to determine the type of object from which each return was reflected. There are commercial products, for example, TerraScan® software, available from Terrasolid Ltd., Ylistönmäentie 26 A313, Fin 40500 Jyväskylä, Finland, and Merrick MARS® software, available from Merrick & Company 2450 South Peoria Street Aurora, Colo. 80014, that can be used to classify the returns.

CAD Modeling of the Conductor(s), Using the Line Temperature at Time of Collection from Thermal Analysis (18)

CAD modeling of line conductors itself is a process well known to the industry. For example, commercially available PLS-CADD® software package, available from Power Line Systems, 610 N. Whitney Way, Suite 160, Madison, Wis. 53705, can be used to model line conductors with LiDAR data.

Thermal Modeling and Line Analysis Employing the CAD Model of the Conductor(s) (20)

In this document, term "thermal line analysis" connotes analysis that is done using a CAD model of the line, and simulating line conditions under different temperatures of the conductors or other line components. The most typical thermal line analysis, Survey Point Clearance (SPC) analysis, checks the required horizontal and vertical clearances of each classified survey point in relation to the displaced conductor. In this document, survey point means a feature in the proximity of the line, that is of interest for line management, and whose location is surveyed. In Survey Point Clearance analysis, the conductor locations are simulated under varying conditions, based on different combinations of wind, ice, and operating temperature and the clearance margin, location, and survey feature type of each point-of-interest is recorded. The final product can be, for example, the identification of survey features that have breached the required clearance distances under client specified conductor conditions. Thermal Line Analysis and Survey Point Clearance analysis can be performed for example within commercially available PLS-CADD® software package, available from Power Line Systems, 610 N. Whitney Way, Suite 160, Madison, Wis. 53705.

Potentially, Sag and Sway Analysis (22) to Determine the Conductor Location in Different Weather Conditions.

Sag and sway analyses are processes well known to the industry. For example, commercially available PLS-CADD® software package, available from Power Line Systems, 610 N. Whitney Way, Suite 160, Madison, Wis. 53705, can be used to perform sag and sway analysis to determine conductor location in different weather conditions. This analysis is not necessary, if the clearances are analyzed as observed-conditions. However, even using as observed-conditions, it is useful to record what the conductor temperature was during analysis.

Clearance Analysis Against Different Classes of LiDAR Data (24)

Clearance analysis is a process well known to the industry. In clearance analysis, the LiDAR returns in one or several classes are selected and smallest distance between the LiDAR return and the target line is calculated. Then, all the points where the distance is less than a given clearance criteria for the given point class are reported. For example, commercially available PLS-CADD® software package, available from Power Line Systems, 610 N. Whitney Way, Suite 160, Madison, Wis. 53705, can be used to perform this task.

Thermal Rating of Line Including Conductor (26)

The Thermal Line Rating (TLR) analysis determines the maximum conductor temperature that can be reached before any required clearance distances are breached. Typically, the conductors are initially placed at 32° F., and then heated to their maximum operating temperature (often 212° F.). At the moment that any clearance distance is breached, the conductor temperature of that span is recorded. The type and location of the corresponding survey feature type may also be recorded. Typically, the final product is the maximum allowable temperature of each circuit's span under the existing as-found conditions. Thermal line rating can be performed for example within commercially available PLS-CADD® software package, available from Power Line Systems, 610 N. Whitney Way, Suite 160, Madison, Wis. 53705.

Vegetation Management (28)

Vegetation management consists of all operations undertaken to keep the vegetation in proximity of powerline, substations or other system components in a condition that does not cause harm or risk to the system operation, reliability or safety. Vegetation management can be planned, for example, in commercially available Powel NetBas software, available from Powel, Inc., 930 Blue Gentian Road, Suite 1300, St. Paul, Minn. 55121. Optionally, vegetation management can include also vegetation growth prediction, which is described in U.S. patent application Ser. No. 12/640,951 filed on Dec. 17, 2009, the entire contents of which is hereby incorporated by reference herein.

An illustrative thermal measurement acquisition process and apparatus, and a process of thermal analysis to determine conductor temperature will now be described. The example includes a method and apparatus for determining conductor temperature from a local thermal sensor, i.e. a thermal sensor in the vicinity of the line. The sensor may be, for example, a thermal sensor attached to, embedded in, integral with, adjacent to, locally directed at, or otherwise associated with and in proximity to the conductor. The thermal measurement is acquired substantially simultaneous with 3-dimensional line location data collection. Substantially simultaneous means taking the thermal measurements at the same time or within such a small time frame, such as 15 minutes, during which the conductor temperature does not change significantly. A typical way to collect 3-dimensional line location information is with Light Detection and Ranging (LiDAR) sensor from a helicopter, moving above the line. Although LiDAR data collection from a helicopter is used as an example herein, fixed wing aircraft, land vehicles, spacecraft or watercraft can be used to collect LiDAR or other 3-dimensional location data of utility lines. The thermal measurement and analysis can be applied to those cases as well.

Accordingly, a method and apparatus are provided to acquire thermal measurements on overhead transmission and distribution conductors at time of 3-dimensional location data (e.g. airborne LiDAR) remote collection, by local thermal measurement acquisition approaches. The method and apparatus may advantageously be used in overhead utility transmission and distribution power line management and in overhead communication or phone line management.

System Components and Process Description

Figure 2:
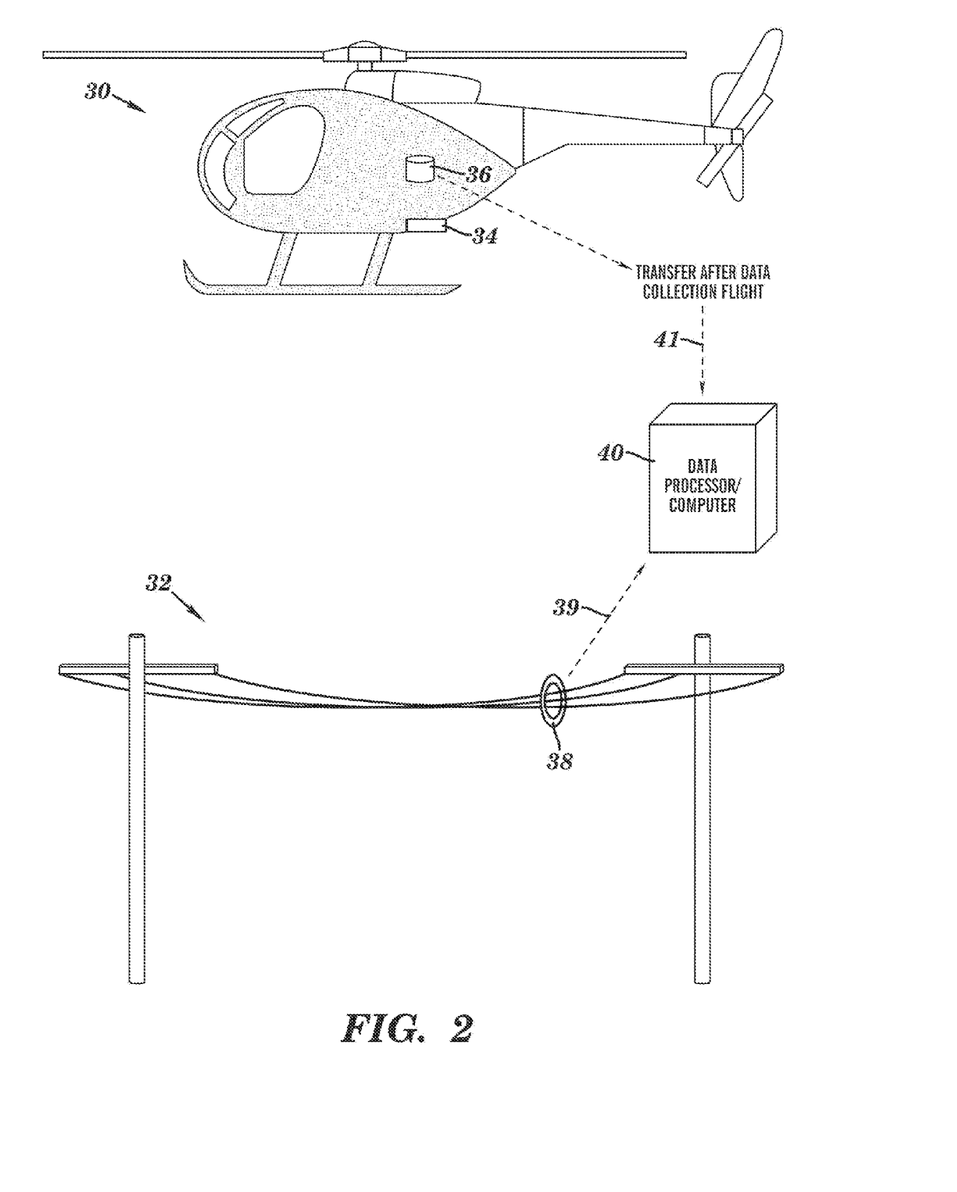
FIG. 2 schematically illustrates an example of apparatus that may be used in implementing the thermal line analysis method.

An illustrative embodiment of the system or apparatus is depicted in FIG. 2 in the context of a helicopter (30) flying above overhead electrical conductors (32) and collecting and storing 3-dimensional location data (e.g. LiDAR data) of the conductors with a location data sensor (34) and an onboard data storage device (36), respectively, and may, for example, include:

A local thermal sensor (38) that acquires thermal measurements of the conductor. The local thermal sensor may, for example, comprise a thermal sensor attached to, embedded in, integral with, adjacent to, locally directed at, or otherwise associated with and in proximity to the conductor. Examples of such local thermal sensors include: an on-line thermometer, a surface acoustic wave temperature sensor such as the SAW sensor available from EnBW Energie Baden-Württemberg AG of Karlsruhe, Germany, an optical fiber distributed temperature sensor such as the Sentinel DTS-XR available from Sensornet Ltd. of Elstree, United Kingdom, a donut shaped thermal monitor such as the Power Donut2 System available from USi of Armonk, N.Y., an infrared camera or sensor, a thermal line scanner, or other available thermal sensing, monitoring and/or measurement device. The thermal measurement may advantageously be acquired with a thermal sensor (38) powered by the conductor (32) and employing wireless communication, such as the Power Donut2 System.

The local thermal sensor (38) communicates the thermal measurement (39) to a Data Processor/Computer (40) having software that runs in the data processor and is used to perform the data correlation/analysis process described hereinafter. Data processor (40) also receives the collected 3-dimensional location data (41) of the conductor(s) from data storage device (36). The conductor location data is transferred to the data processor in any known manner.

A suitable data processor/computer is, for example, a typical PC (Personal Computer) workstation or a laptop computer or mobile workstation computer, equipped with a program to perform the manipulation and analysis. An example of a commercially available laptop is Dell Latitude E6520, equipped with Intel® Core™ i5-2520M 2.50 GHz processor, 4.0 GB, DDR3-1333 MHz SDRAM memory and 320 GB 7200 rpm Hard Drive, available from www.dell.com.

Figure 3:
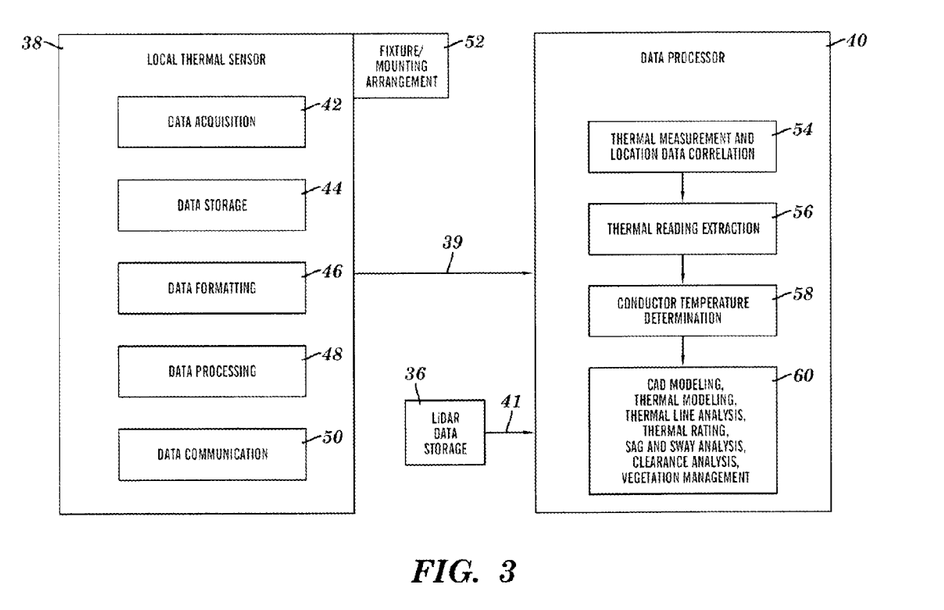
FIG. 3 is a block diagram of apparatus that may be used in implementing the thermal line analysis method.

As illustrated in the block diagram of FIG. 3, the local thermal sensor (38) may include facilities for data acquisition (42), data storage (44), data formatting (46), data processing (48) and data communication (50). These facilities may be implemented in known fashion. The data formatting and/or data processing modules may, advantageously, perform the functions of: geographically associating the thermal measurement with the geographic location of the local thermal sensor, and time referencing the thermal measurement with a thermal measurement acquisition time. Alternatively, these functions may be performed in other components of the apparatus, e.g. data processor (40) or a separate sensor controller (not shown). The local data sensor may be positioned on or in the vicinity of the conductor with a fixture or other suitable mounting arrangement (52), in known fashion.

The thermal measurements (39) from the local thermal sensor (38) my be communicated directly to the data processor (40) or via a sensor controller, the internet, or other intermediary or modality (not shown), in known fashion. The thermal measurements may, advantageously be communicated wirelessly.

Data processor (40) receives and processes/analyzes the thermal measurements (39) acquired by local thermal sensors (38), and 3-dimensional location data (41) collected by remote location sensor (34). This processing/analysis may include correlating the thermal measurement with the collected 3-dimensional location data of the conductor (54) based upon the geographic location of the local thermal sensor and the measurement acquisition time, extracting a thermal reading (56) from the thermal measurement, and determining temperature of the conductor (58) from the extracted thermal reading.

For example, in one embodiment of the local thermal sensor, a thermocouple can be placed in physical contact with the line conductor and insulated from external temperature impact. The thermocouple can be made from a material where the electric resistance varies depending on the temperature. This kind of an electronic component is sometimes called a thermistor. The resistance is observed with an electronic resistance measurement device. The resistance at any given temperature of the thermistor has been observed and correlated in local thermal sensor calibration phase. The temperature and time are read based on measured resistance using the calibrated correlation model, and the readings are recorded in small time intervals to a local thermal sensor reading file.

Correlating the thermal measurements with the 3-dimensional location data can be done, for example, using the following process:

Local thermal sensor takes the thermal measurements continuously, or periodically at small time intervals, or at request.

The local thermal sensor readings are tied to a time stamp. The sensor readings at given time are stored to a file (local thermal sensor reading file).

The local thermal sensor locations are acquired for example using a GPS device during installation, or, alternatively using a commercial or free mapping service (for example Google Earth) and stored to a file (local thermal sensor location file).

The time when the 3-dimensional location sensor was acquiring the location of the line is stored in a file (3D location sensor trajectory file). This can be done, for example, using position recording GPS device that stores locations with a time stamp or using the 3-dimensional location sensor trajectory information that is acquired from the positioning unit of any 3-dimensional location sensor.

Using the local temperature sensor reading file, local thermal sensor location file and 3-dimensional location sensor trajectory file, the local thermal sensor readings are correlated by finding the time when the 3-dimensional location sensor trajectory file shows closest location to the local thermal sensor location and reading the temperature from the local thermal sensor reading file at that time.

The process of correlating local thermal measurements to the 3-dimensional location sensor data can be implemented by a computer program and performed automatically in a computer/data processor. Alternative correlation techniques may also be employed. From the results of the correlation, a local thermal reading of the conductor at the time of 3-dimensional location data collection of the conductor can be extracted, to inform or determine the concurrent conductor temperature.

In addition to such thermal analysis, data processor (40) may also perform certain of the functions (60) depicted in FIG. 1, namely, generating a CAD model of the conductor using the 3-dimensional location data of the conductor collected by the remote location sensor, and the determined conductor temperature based on the thermal measurement of the conductor acquired by the local thermal sensor, and may also perform at least one of: thermal modeling of the conductor, determining thermal rating of a line containing the conductor, thermal line analysis of the conductor, and analyzing clearance between the conductor and surroundings of the conductor, in known fashion, based on the determined temperature.

Line Modeling Process with Determined Conductor Temperatures

The line modeling process itself is well-known to the industry and is presented, for example, in the following articles: Hooper, Brian, "Vegetation Management Takes to the Air", Transmission & Distribution World, September 2003; and Hooper, Brian & Bailey, Tom, "Aerial Surveys Calculate Vegetation Growth", Transmission & Distribution World, September 2003. These articles are hereby incorporated by referece herein.

3D CAD modeling of transmission lines can be done using the LiDAR measurements. For example, commercially available PLS-CADD® software package, available from Power Line Systems, 610 N. Whitney Way, Suite 160, Madison, Wis. 53705, can be used to model line conductors with LiDAR data.

3D CAD modeling of transmission lines can be done using the LiDAR measurements. Transmission structures, conductor location and conductor attachment points are identified. Structures and conductors are modeled to match the LiDAR. The as observed-conductor location is often modeled by fitting a wire in the model to match the catenaries of LiDAR returns from conductor for each span. Conductor type, diameter, weight and temperature are attributed to the model. The temperature is taken from the above described temperature determination process.

ADVANTAGES AND BENEFITS OF THIS INVENTION

This invention contemplatess local thermal measurements of conductor temperature at time of LiDAR collection and use of such measured conductor temperature, acquired from the direct thermal measurements, for power line clearance analysis. Measured thermal readings allow more accurate temperature information than temperatures modeled from ambient conditions and line loading information.

Spatial accuracy of the temperature information is better than the information that is derived from ambient conditions and line loading. Each span that has a local thermal sensor can have a measured reading. The added spatial accuracy benefits especially line modeling in variable terrain, like mountains, where the line crosses many different elevations, wind channels, and other features that impact small-scale weather. A weather station that is located in horizontal proximity but in different elevation may show different weather conditions.

Additionally, using weather stations, it is difficult to measure the weather conditions on the conductor level. The conductors may experience substantially higher wind than ground level weather station.

The improved accuracy of the conductor temperature measurements is beneficial, especially when maximum operating temperature or line clearances are analyzed. High costs may be incurred to improve or maintain the line rating. Higher measurement precision allows more accurate rating and safe operation of the line at its maximum capacity. This is especially critical today, when many lines operate on the upper end of their maximum capacity, and lines are re-built to increase the rating.

Vegetation management benefits from improved accuracy in conductor sag analysis. Less vegetation needs to be cut if smaller measurement error margins can be applied to ensure safe and reliable operation.

This new thermal line analysis technology provides electric utilities with the methodology to replace the calculated, or estimated, temperature of their conductors based on weather conditions and line loading with more precise, actual temperature readings based on local thermal measurements of the conductor. The associated decrease in margin of error enables utilities to: improve system reliability and capacity; enhance the security of transmission assets; demonstrate compliance with applicable regulatory requirements; and reduce mitigation costs associated with compliance.

This invention materially contributes to more efficient utilization and conservation of energy resources. It provides methodology to build LiDAR-based line models using local thermal sensors. LiDAR-based line models are the basis of today's transmission line maintenance, design, and capacity and safety analysis. Accurate temperature information provides the most precise data available for grid capacity, which is a critical input for energy efficiency.

The invention also allows more efficient use of renewable energy, by optimizing transfer capacity from generation to consumers. It can enable generators to more accurately see the flow of electricity through transmission conductors, thereby making improvements to the grid where it is most urgently needed.

Additionally, the invention supplies utilities with precise data to identify congestion points on the grid. This is a critical input for efficient capital utilization and to enhance reliability. Grid safety and reliability are major issues in the electric utility industry.

Although specific examples have been described herein, other approaches, apparatus, components and methods may be employed to implement the invention.

The invention claimed is:

1. A method for thermal line analysis of an overhead electrical conductor, comprising:
   by a processor, accessing 3-dimensional location data of an overhead conductor;
   by the processor, accessing a thermal measurement of the conductor that was collected by a local thermal sensor substantially simultaneous with a time when the 3-dimensional location data was collected;
   by the processor, generating a computer assisted design (CAD) model of the conductor using the 3-dimensional location data of the conductor and the thermal measurement of the conductor, and by the processor, employing the computer assisted design (CAD) model to perform a thermal line analysis of the conductor.

2. The method of claim 1, wherein the sensor is attached to, embedded in, integral with, adjacent to, locally directed at, or otherwise associated with and in proximity to the conductor.

3. The method of claim 1 wherein the thermal sensor is powered by the conductor.

4. The method of claim 1, further comprising geographically associating the thermal measurement with a geographic location of the local thermal sensor and the time.

5. The method of claim 1, further comprising correlating the thermal measurement with the collected 3-dimensional location data of the conductor.

6. The method of claim 5, further comprising:
extracting a thermal reading from the thermal measurement, and
determining temperature of the conductor from the thermal reading.

7. The method of claim 1, further comprising:
the thermal line analysis comprises determining a temperature of the conductor at the time;
and the method further comprises employing the computer assisted design (CAD) model of the conductor to analyze clearance between the conductor and surroundings of the conductor.

8. The method of claim 7, wherein employing the computer assisted design (CAD) model to analyze clearance comprises conducting at least one of a sway analysis and a sag analysis to determine conductor location in different weather and/or line loading conditions.

9. The method of claim 1, further comprising:
the thermal line analysis comprises determining a temperature of the conductor at the time;
and the method further comprises employing the computer assisted design (CAD) model of the conductor to determine a thermal rating of a target line that includes the conductor.

10. The method of claim 1, wherein the 3-dimensional location data comprises data collected by a sensor remote from the conductor.

11. The method of claim 1, wherein the 3-dimensional location data comprises LiDAR data collected from an airborne vehicle.

12. A method for determining temperature and for thermal line analysis of an overhead electrical conductor, comprising:
by a processor, accessing 3-dimensional location data of an overhead conductor;
by the processor, accessing a thermal measurement of the conductor that was collected by a local thermal sensor substantially simultaneous with a time when the 3-dimensional location data was collected; and
by the processor, performing a thermal analysis of the thermal measurement to determine temperature of the conductor at the time.

13. The method of claim 12, further comprising generating a computer assisted design (CAD) model of the conductor using the 3-dimensional location data of the conductor and the determined temperature of the conductor.

14. The method of claim 13, further comprising employing the computer assisted design (CAD) model for at least one of: thermal line analysis of the conductor, thermal rating of a power line that includes the conductor, clearance analysis relative to the conductor, and vegetation growth management relative to the conductor.

15. The method of claim 12, wherein the thermal analysis includes correlating the thermal measurement of the conductor with the 3-dimensional location data of the conductor.

16. Apparatus for determining temperature and for thermal line analysis of an overhead electrical conductor, comprising:
a processor;
a non-transitory computer-readable medium on which is stored location data and thermal measurement data for a plurality of overhead electrical conductors; and
a computer-readable memory containing programming instructions that enable the processor to:
access 3-dimensional location data of a selected one of the overhead conductors;
access a thermal measurement of the conductor that was collected substantially simultaneous with the 3-dimensional location data; and
correlate the 3-dimensional location data of the selected conductor and the thermal measurement of the selected conductor to determine a temperature of the selected conductor.

17. The apparatus of claim 16, wherein the instructions also enable the processor to generate a computer assisted design (CAD) model of the conductor using the 3-dimensional location data, and the thermal measurement.

18. The apparatus of claim 17, wherein the instructions also enable the processor to perform at least one of: thermal modeling of selected the conductor, determining thermal rating of a line containing the selected conductor, thermal line analysis of the selected conductor, and analyzing clearance between the selected conductor and surroundings of the selected conductor based on the determined temperature.

* * * * *